United States Patent
Mohiuddin et al.

(10) Patent No.: US 9,781,658 B1
(45) Date of Patent: Oct. 3, 2017

(54) WIRELESS COMMUNICATION DEVICE DETECTION WITH A PSEUDO-PILOT SIGNAL

(75) Inventors: Mohammed Ghouse Mohiuddin, Overland Park, KS (US); Stephen R. Bales, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 853 days.

(21) Appl. No.: 13/090,480

(22) Filed: Apr. 20, 2011

(51) Int. Cl.
*H04W 4/00* (2009.01)
*H04W 72/00* (2009.01)
*H04W 48/16* (2009.01)
*H04W 60/00* (2009.01)
*H04W 60/04* (2009.01)

(52) U.S. Cl.
CPC ........... *H04W 48/16* (2013.01); *H04W 60/00* (2013.01); *H04W 60/04* (2013.01)

(58) Field of Classification Search
CPC ..... H04W 60/04; H04W 60/00; H04W 56/00; H04W 48/16
USPC ...................... 455/552.1, 553.1, 435.1, 435.2
See application file for complete search history.

(56) References Cited

U.S. PATENT DOCUMENTS

| | | | |
|---|---|---|---|
| 5,966,661 A * | 10/1999 | Bernardin et al. | 455/446 |
| 7,280,826 B2 * | 10/2007 | Nylander et al. | 455/433 |
| 2006/0197702 A1 | 9/2006 | Jones | |
| 2006/0246899 A1 * | 11/2006 | Buckley et al. | 455/435.2 |
| 2008/0182614 A1 * | 7/2008 | Cormier et al. | 455/552.1 |
| 2010/0093284 A1 * | 4/2010 | Terrero Diaz-Chiron et al. | 455/67.11 |
| 2010/0190488 A1 * | 7/2010 | Jung et al. | 455/424 |
| 2010/0216403 A1 * | 8/2010 | Harrang | 455/41.3 |
| 2011/0003590 A1 * | 1/2011 | Yoon et al. | 455/432.1 |
| 2011/0007637 A1 * | 1/2011 | Chen et al. | 370/252 |

FOREIGN PATENT DOCUMENTS

WO    WO 2009121833 A1 * 10/2009    ............ H04W 16/18

OTHER PUBLICATIONS

"Home Wireless Networking in a Snap" © 2006 by Joseph Habraken pp. 347-348.*

* cited by examiner

*Primary Examiner* — Joshua Schwartz

(57) ABSTRACT

A wireless detection device receives a user input indicating at least one wireless communication network service. The detection device processes the user input to select a pseudo-pilot signal configuration. The detection device wirelessly transmits a pseudo-pilot signal having the selected pseudo-pilot signal configuration. The detection device wirelessly receives a device identifier from a wireless communication device responsive to the pseudo-pilot signal. The detection device stores data indicating the device identifier and a time when the device identifier was received from the wireless communication device. The detection device may transfer the data to a control system or display the data to the user.

18 Claims, 8 Drawing Sheets

WIRELESS COMMUNICATION DEVICE DETECTION WITH A PSEUDO-PILOT SIGNAL

TECHNICAL BACKGROUND

Wireless communication devices exchange wireless signals with wireless networks to obtain various communication services, such as voice calling, text messaging, internet access, and the like. A typical wireless communication device communicates through multiple different wireless access points in the wireless network as it moves about. Thus, the wireless communication device identifies and selects individual wireless access points for communication services.

To facilitate this selection, the wireless access points broadcast pilot signals. Each pilot signal has unique signal characteristics that allow the communication devices to distinguish one pilot signal from another. Thus, pilot signals can be distinguished by frequency and protocol, such as a WIFI pilot signal and a CDMA 1× pilot signal. Wireless communication devices are configured to scan for the pilot signals associated with their communication network service. For example, a WIFI device will scan for a WIFI pilot signal.

A wireless communication device typically identifies pilot signals with the characteristics of their communication service, and then selects one of these pilots signals with the most signal power. The communication device then responds to the most powerful pilot signal for their service by transferring their device electronic serial number (or some other identifier) to the corresponding wireless access point. The selected wireless access point receives the response and initiates registration and subsequent wireless service for the wireless communication device.

OVERVIEW

A wireless detection device receives a user input indicating at least one wireless communication network service. The detection device processes the user input to select a pseudo-pilot signal configuration. The detection device wirelessly transmits a pseudo-pilot signal having the selected pseudo-pilot signal configuration. The detection device wirelessly receives a device identifier from a wireless communication device responsive to the pseudo-pilot signal. The detection device stores data indicating the device identifier and a time when the device identifier was received from the wireless communication device. The detection device may transfer the data to a control system or display the data to the user.

DETAILED DESCRIPTION

Figure 1:
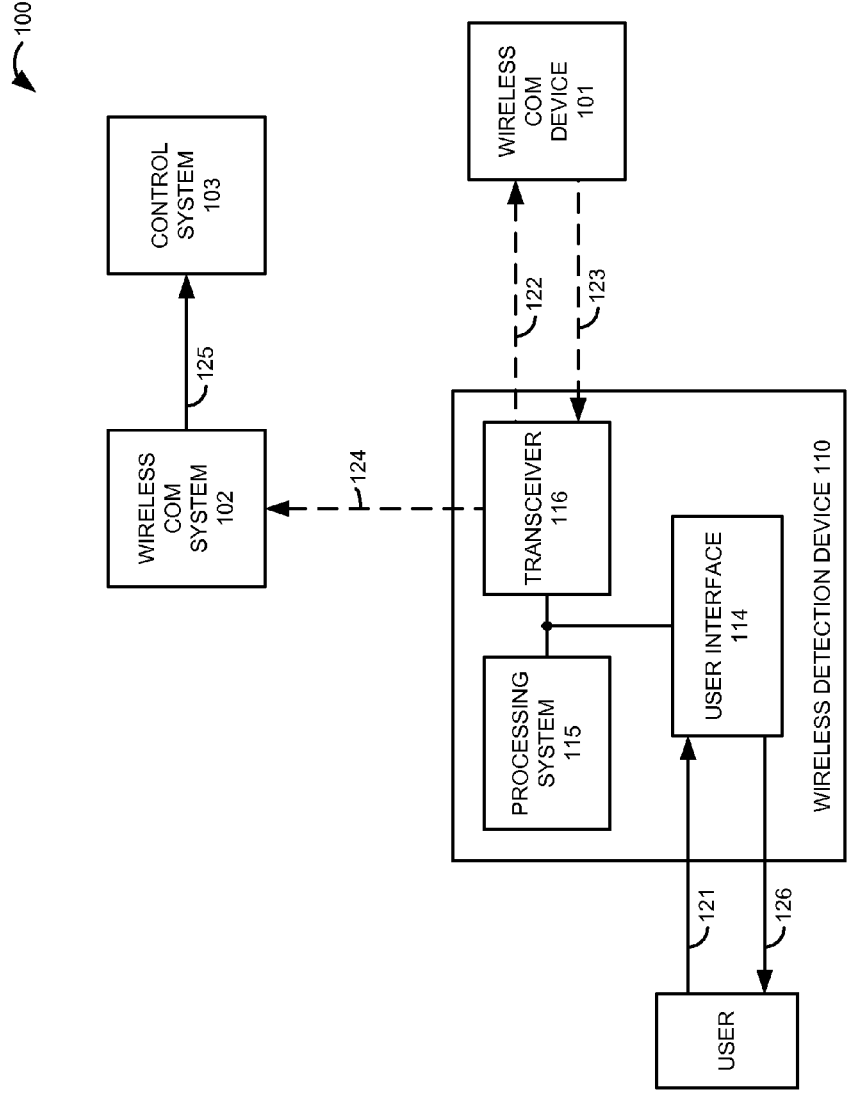
FIG. 1 illustrates a communication system to detect wireless communication devices that respond to pilot signals.

FIG. 1 illustrates communication system 100 to detect wireless communication devices that respond to pilot signals. Communication system 100 comprises wireless communication device 101, wireless communication system 102, control system 103, and wireless detection device 110. Wireless detection device 110 comprises user interface 114, processing system 115, and wireless transceiver 116, which are operatively coupled together. Wireless communication device 101 could be a phone, computer, e-book, internet appliance, media player, or some other device that responds to wireless pilot signals. Wireless detection device 110 detects wireless communication device 101 as follows.

User interface 114 receives user input 121 from the user, where the input indicates at least one wireless communication network service. The wireless communication network service could be indicated by a wireless service brand name (such as Sprint), a wireless technology type (such as WI-FI), or some other service indicator (such as frequency and protocol). User interface 114 provides the user input to processing system 115. Processing system 115 processes the service indicator(s) from the user input to select a pseudo-pilot signal configuration. The pseudo-pilot signal configuration comprises specifications for a wireless signal including frequency, power, and coding. Processing system 115 provides the selected pseudo-pilot signal configuration to wireless transceiver 116. Wireless transceiver 116 wirelessly transmits pseudo-pilot signal 122 having the selected pseudo-pilot signal configuration.

Wireless communication device 101 scans for pilot signals and receives pseudo-pilot signal 122. In response to pseudo-pilot signal 122, wireless communication device 101 wireless transfers device identifier 123 which is then received by wireless transceiver 116. Device identifier 123 could be an electronic serial number, mobile device ID, user name and password, or some other identifying data for device 101.

Processing system 115 receives data indicating the device identifier from transceiver 116 and logs the time of day and date when device identifier 123 was received from wireless communication device 102. Processing system 115 stores the device identifier in association with its time of receipt. Note that processing system 115 and wireless transceiver 116 are passive in that they do not respond to wireless communication device 101 after receipt of device identifier 123. Thus, wireless detection device 110 transmits pseudo-pilot signal 122, but does not engage device 101 with additional registration signals.

In some examples, wireless detection device 110 may engage in actual registration and provide wireless service (such as a pico-cell base station) in some modes, but the user could put detection device 110 in a detection-only mode where actual registration and service is not provided.

In some examples, processing system 115 provides the device identifier and its time of receipt to transceiver 116. Transceiver 116 wirelessly transfer data 124 indicating the device identifier for device 101 and its time of receipt by detection device 110. Wireless communication system 102 receives data 124 and transfers corresponding data 125 to control system 103. Thus, wireless detection device 110 reports the device identifier and its time of receipt to control system 103. Wireless communication system 102 could be a base station, access point, or some other networked communication system with wireless access. Control system 103 could be a phone, computer, server, and the like.

In some examples, processing system 115 provides the device identifier and its time of receipt to user interface 114. User interface 114 displays data 126 indicating the device identifier for device 101 and its time of receipt by detection device 110. Thus, the user may view the device identifier and its time of receipt.

Figure 2:
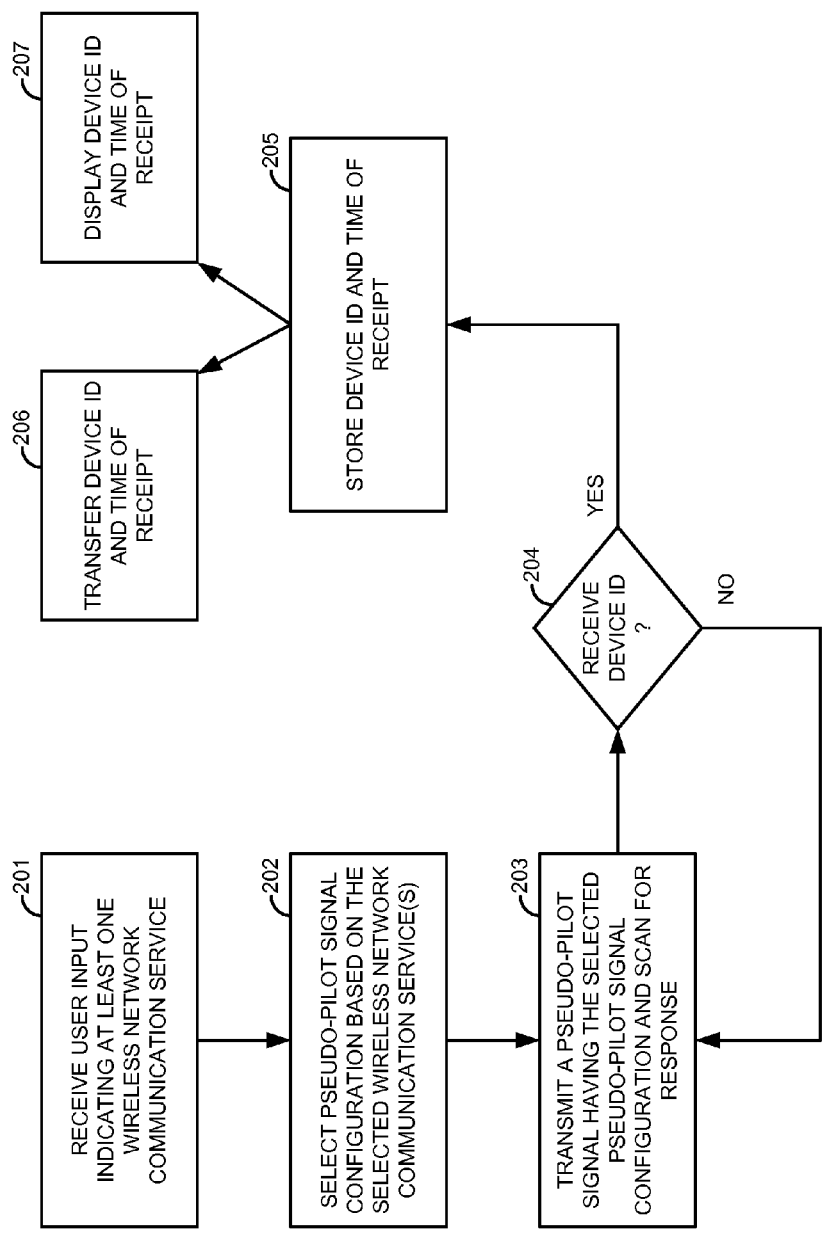
FIG. 2 illustrates the operation of a wireless detection device to detect wireless communication devices that respond to pilot signals.

FIG. 2 illustrates the operation of a wireless detection device like detection device 101. The detection device receives a user input that indicates at least one wireless communication network service (201). The wireless communication network service could be indicated by a wireless service brand name, wireless technology type, or some other service indicator. In some examples, the detection device displays a list of network services and/or technologies for user selection.

The detection device processes the service indicator(s) from the user input to select a pseudo-pilot signal configuration (202). In some examples, the detection device enters a data structure with the service indicator(s) to yield the pseudo-pilot signal configuration. For example, the detection device may enter the data structure with Sprint and yield a pseudo-pilot signal configuration for a Sprint pilot signal. In another example, the detection device may enter the data structure with WIFI and yield a pseudo-pilot signal configuration for a public WI-FI pilot signal. Thus, the data structure associates wireless service indicators with pilot signal configurations. In some examples, the use of multiple service indicators yields a pilot signal configuration with multiple signal components—possibly one signal component for each service indicator.

The detection device wirelessly transmits a pseudo-pilot signal having the selected configuration then scans for a response having a device ID (203). In examples where multiple signal components are provided, the resulting pseudo-pilot signal combines signal components. The device ID could be an electronic serial number, mobile device ID, user name and password, or some other identifying data for the detected device. If a response having a device ID is received (204), then the detection device stores the device ID and its time of receipt (205). In some examples, the detection device may transfer the device ID and time of receipt (206) and/or display the device ID and time of receipt (207). Note that the wireless detection device transmits a pseudo-pilot signal, but does not engage the detected device with additional registration signals.

Figure 3:
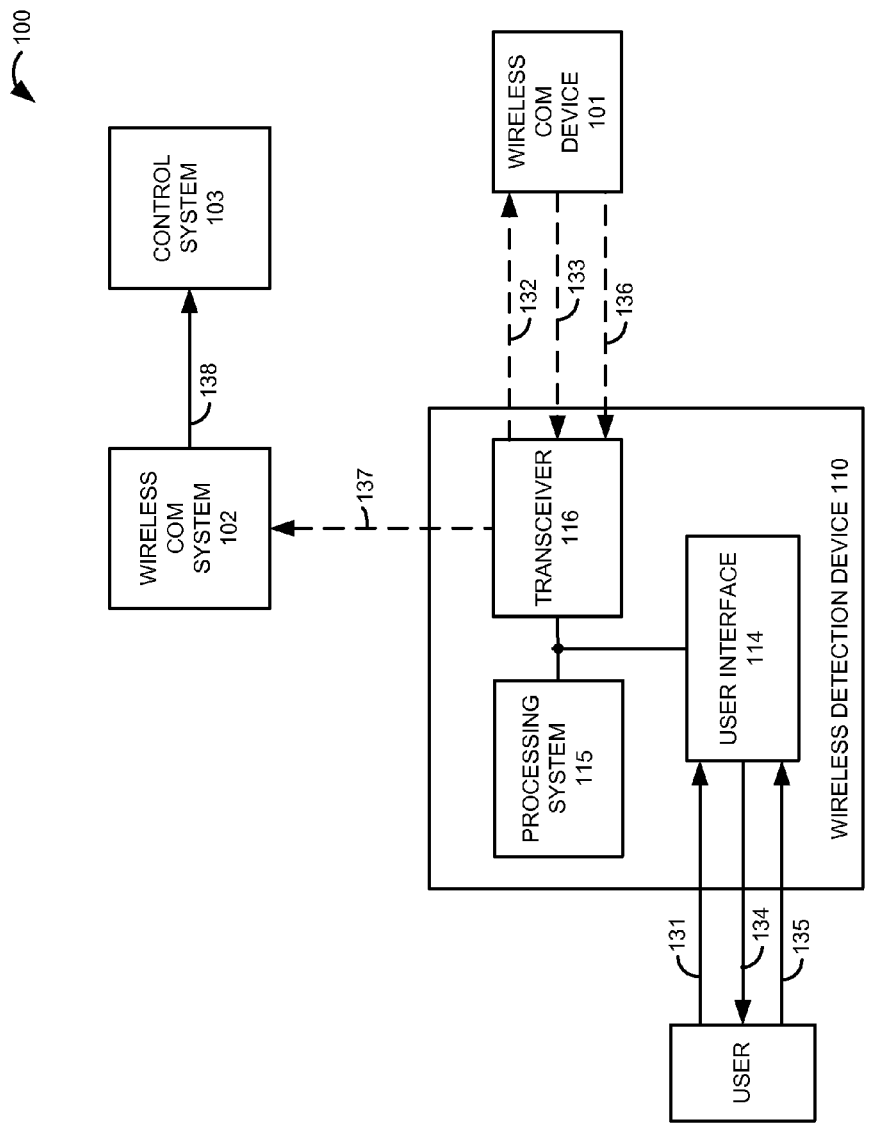
FIG. 3 illustrates a communication system to detect wireless communication devices that respond to pilot signals and to provide remote alerts.

FIG. 3 illustrates additional features of communication system 100 that may be present is some examples. User interface 114 receives user input 131 that input indicates at least one wireless communication network service. Processing system 115 processes the service indicator(s) to select a pseudo-pilot signal configuration. Wireless transceiver 116 wirelessly transmits pseudo-pilot signal 132 having the selected pseudo-pilot signal configuration. Wireless communication device 101 scans for pilot signals and receives pseudo-pilot signal 132. In response to pseudo-pilot signal 132, wireless communication device 101 wireless transfers device identifier 133 which is then received by wireless transceiver 116. Processing system 115 stores the device identifier in association with its time of receipt.

Processing system 115 provides the device identifier and its time of receipt to user interface 114. User interface 114 displays data 134 indicating the device identifier for device 101 and its time of receipt by detection device 110. The user views the device identifier and its time of receipt, and provides user input 135 requesting an alert for the device identifier. User interface 114 detects user input 135 and provides the alert request to processing system 115. In response to the alert request from the user, processing system 115 configures itself to provide an alert if the device identifier is detected again.

Subsequently, wireless transceiver 116 again transmits pseudo-pilot signal 132 to wireless communication device 101. In response to pseudo-pilot signal 132, wireless communication device 101 transfers its device identifier 136. Device identifier 136 is received by wireless transceiver 116 and provided to processing system 115. Processing system 115 stores the device identifier in association with its second time of receipt.

In response to the alert request, processing system 115 provides the device identifier and its time of receipt to wireless transceiver 116. Transceiver 116 wirelessly transfers alert 137 indicating the device identifier for device 101 and its second time of receipt by detection device 110. Wireless communication system 102 receives alert 137 and transfers corresponding alert 138 to control system 103. Thus, in response to the first detection and alert request, wireless detection device 110 reports the device identifier and its second time of receipt to control system 103. In some examples, control system 103 is a wireless phone or computer, and the alerts comprises text messages, emails, or the like.

Figure 4:
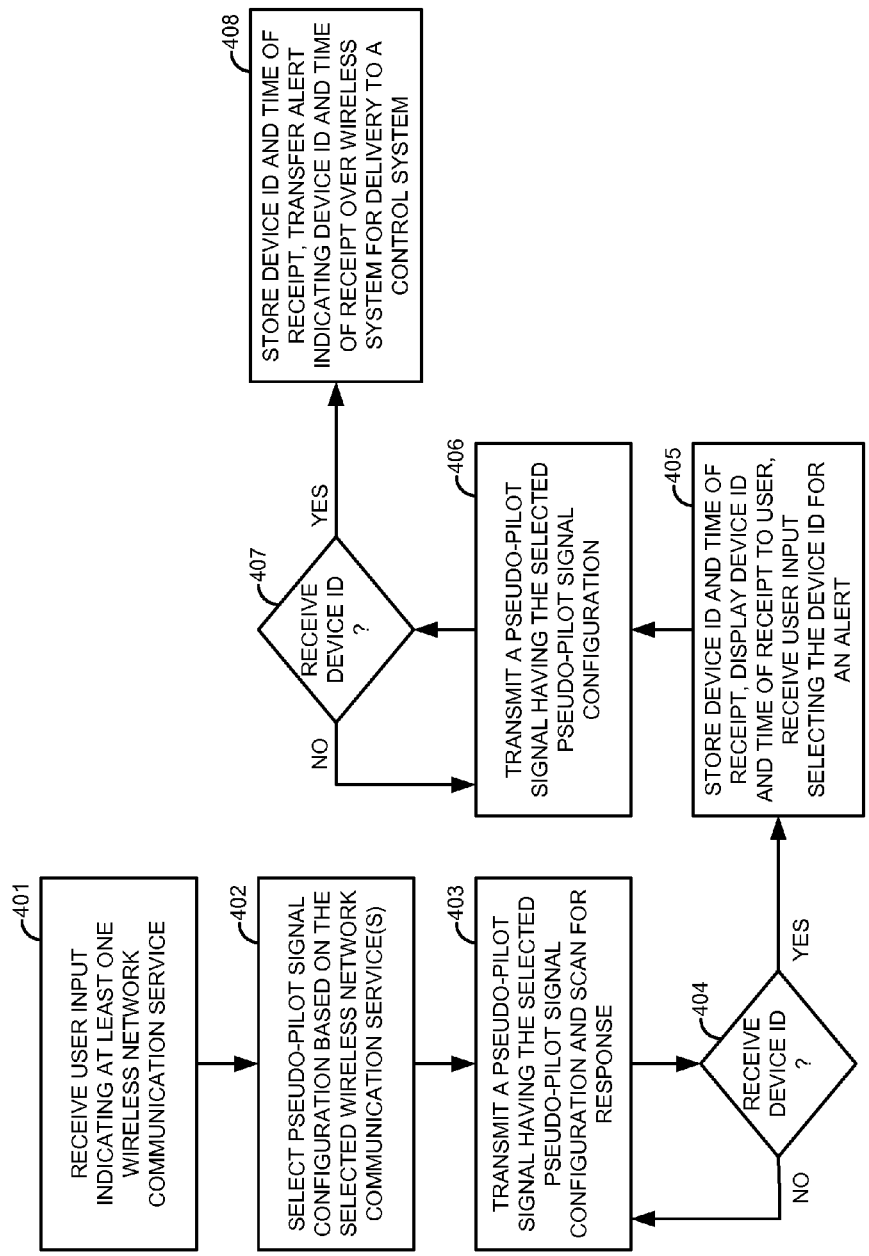
FIG. 4 illustrates the operation of a wireless detection device to detect wireless communication devices that respond to pilot signals and to provide remote alerts.

FIG. 4 illustrates the operation of a wireless detection device like detection device 101 having the additional features described above. The detection device receives a user input that indicates at least one wireless communication network service (401). In some examples, the detection device displays a list of network services and/or technologies for user selection. The detection device processes the service indicator(s) from the user input to select a pseudo-pilot signal configuration (402). In some examples, the detection device enters a data structure with the service indicator(s) to yield the pseudo-pilot signal configuration, and the use of multiple service indicators may yield a pilot signal configuration with multiple signal components.

The detection device wirelessly transmits a pseudo-pilot signal having the selected configuration and then scans for a response having a device ID (403). If a response having a device ID is received (404), then the detection device stores the device ID and its time of receipt, displays the device ID and time of receipt, and receives a user input selecting the device ID for an alert (405). The user input may have additional instructions, such as a type of alert and a destination address or number to route the alert.

The detection device wirelessly transmits the pseudo-pilot signal and scans for a response (406). If a response having the selected device ID is received (407), then the detection device stores the selected device ID and its time of receipt, and wirelessly transfers an alert with the device ID and time of receipt for delivery to a control system (408). The alert could be a text message, email, or some data message.

Figure 5:
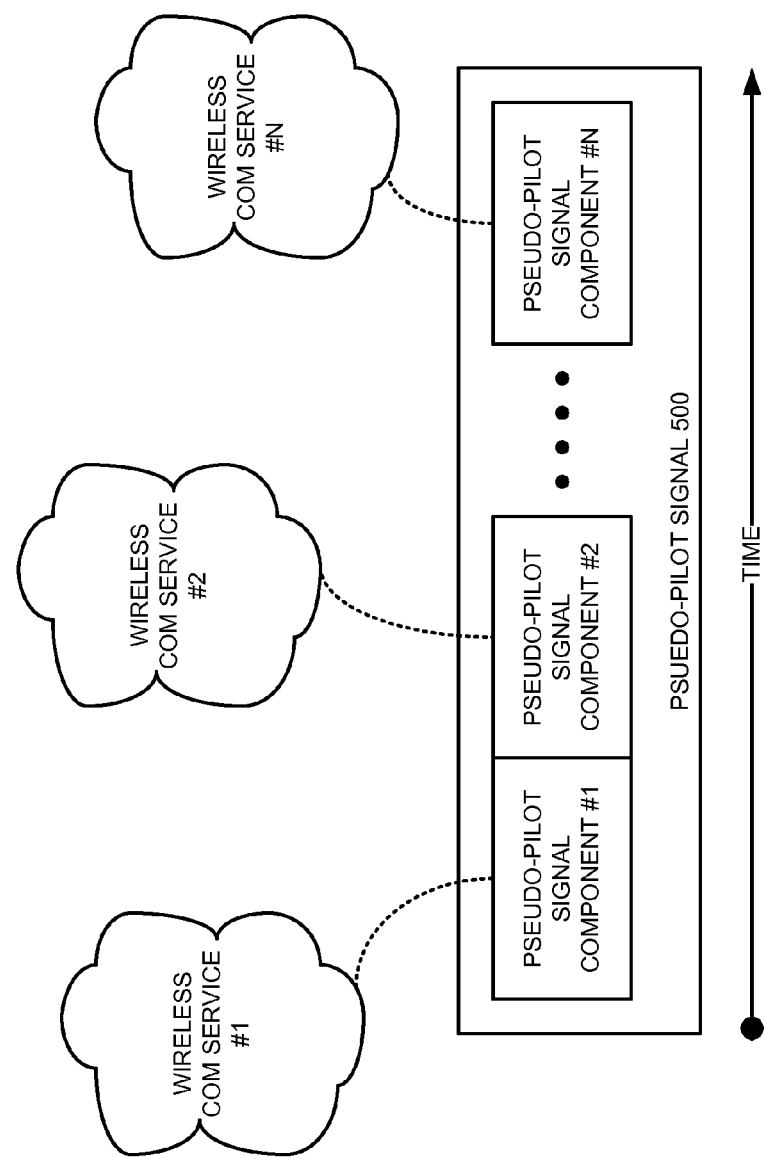
FIG. 5 illustrates a pseudo-pilot signal having time-multiplexed signal components.

FIG. 5 illustrates pseudo-pilot signal 500. Pseudo-pilot signal 500 comprises signal components #1-N. Each signal component #1-N is associated with one of wireless communication services #1-N (as indicated by the dotted lines).

Each signal component is a time slice of a pseudo-pilot signal for the associated service. For example, signal component #1 may be a pseudo-pilot signal for a public WIFI service, and signal component #2 could be a pseudo-pilot signal for a Sprint wide-area network service. The signal components #1-N are time multiplexed for transmission. Each component time slice should be long enough for scanning devices to acquire and respond to the individual signal components in pseudo-pilot signal 500.

Figure 6:
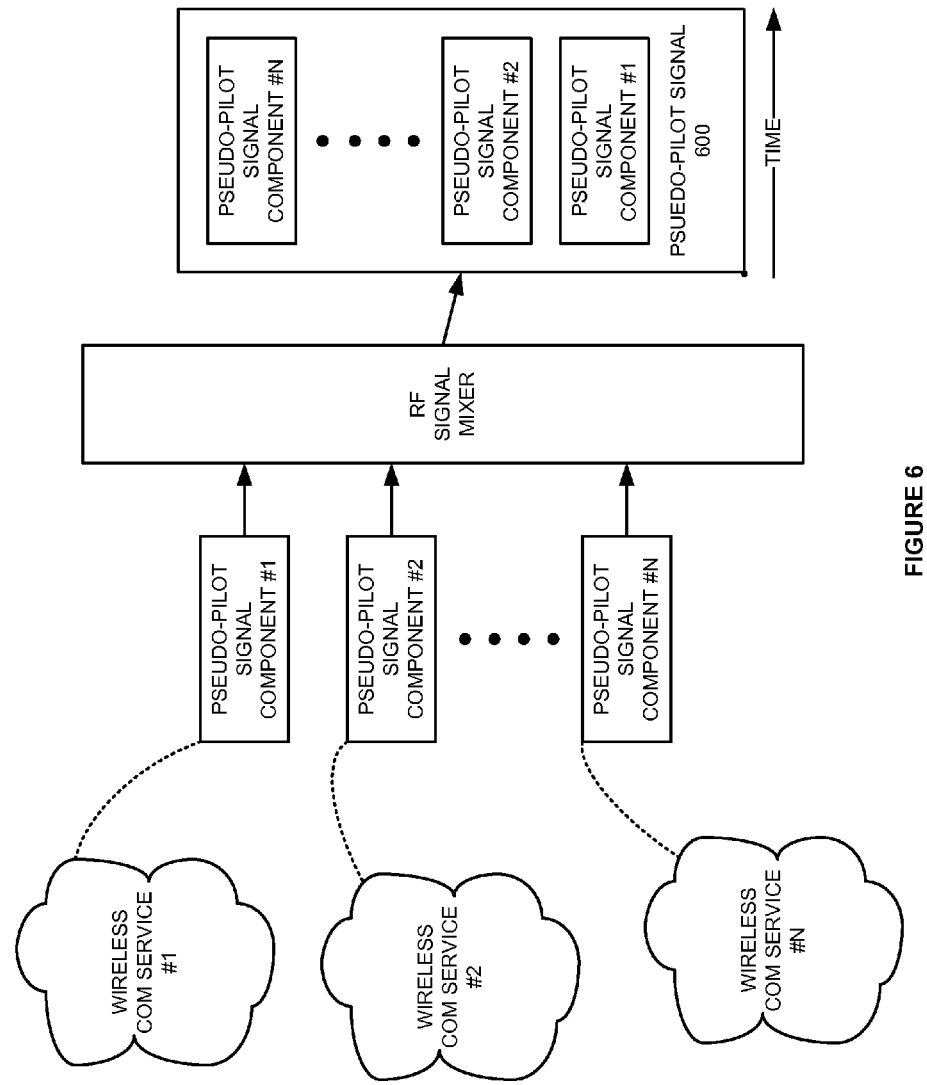
FIG. 6 illustrates a pseudo-pilot signal having frequency-multiplexed signal components.

FIG. 6 illustrates pseudo-pilot signal 600. Pseudo-pilot signal 600 comprises signal components #1-N. Each signal component #1-N is associated with one of wireless communication services #1-N (as indicated by the dotted lines). Each signal component is a pseudo-pilot signal for the associated service. For example, signal component #1 may be a pseudo-pilot signal for a public WIFI service, and signal component #2 could be a pseudo-pilot signal for a Sprint wide-area network service. The signal components #1-N are frequency multiplexed for transmission. The frequencies should be separated far enough apart for scanning devices to acquire and respond to the individual signal components in pseudo-pilot signal 500.

Figure 7:
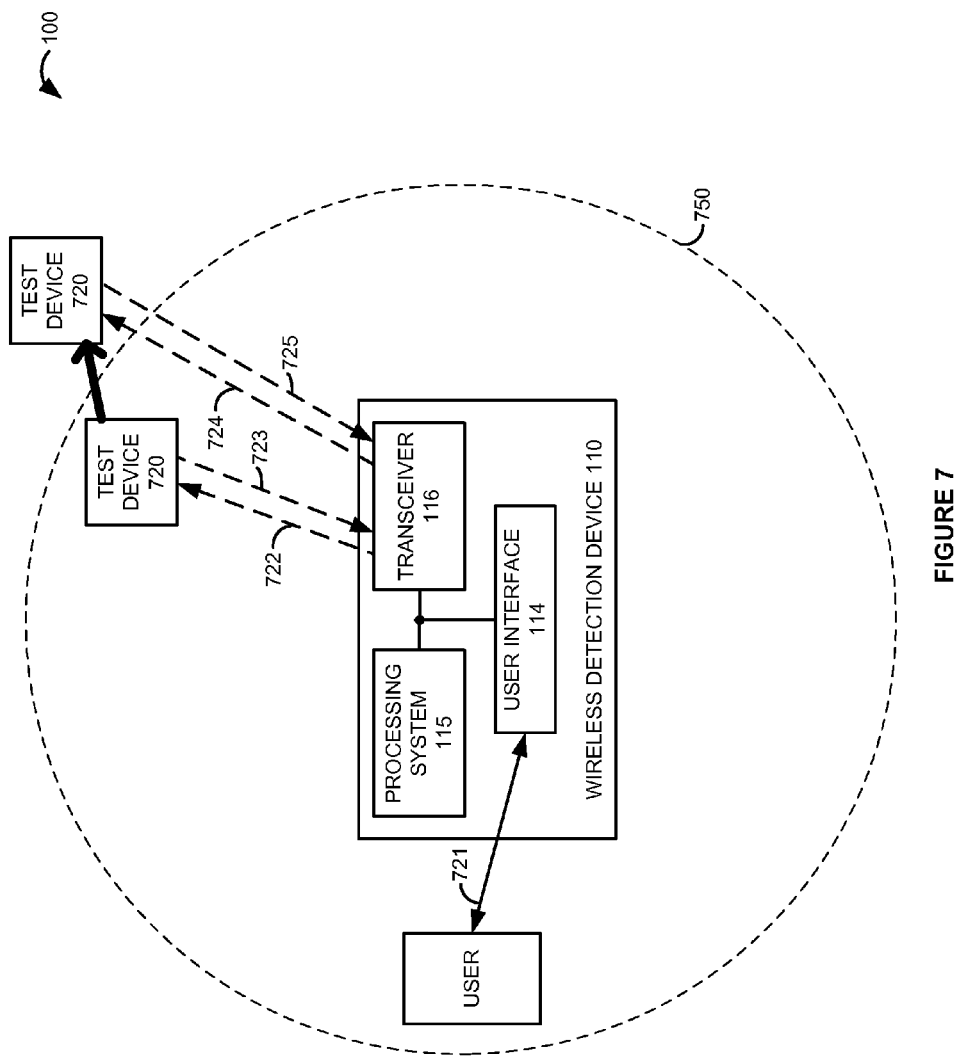
FIG. 7 illustrates a communication system to select power levels for pseudo-pilot signals.

FIG. 7 illustrates additional features of communication system 100 that may be present is some examples. Note detection boundary 750 which represents the area where device detection is desired. The area would typically be relatively small, such as a room, office, or residence. The user and user interface 114 exchange communications 721 to initiate and perform a power configuration procedure. Thus, the procedure is designed to establish a power level to extend a pseudo-pilot signal to detection boundary 750 without significant signal power extending beyond signal boundary 750. The power of the pseudo-pilot signal in the detection area should also be stronger than ambient pilot signals in the general area. Detection device 110 may scan to determine these ambient pilot signal powers.

The user and user interface 114 exchange communications 721 to initiate and perform the power configuration procedure. Communications 721 includes the display of user instructions to place test device 720 inside the edge of detection boundary 750 and then beyond detection boundary 750. Communications 721 and the associated processing also include the wireless service selection and signal configuration operations described above. Thus as a part of the procedure, the user positions test device 720 within detection boundary 750. Test device 720 could be a phone, computer, or other device that responds to pilot signals.

Wireless transceiver 116 wirelessly transmits pseudo-pilot signal 722 at increasing power levels. Test device 720 scans for pilot signals and eventually receives pseudo-pilot signal 722 as its power increases. In response to pseudo-pilot signal 122, wireless communication device 101 transfers device identifier 723 which is received by wireless transceiver 116. Processing system records the power level near the edge of detection boundary 750.

The user then positions test device 720 beyond detection boundary 750. Wireless transceiver 116 then wirelessly transmits pseudo-pilot signal 724 at increasing power levels. Test device 720 scans for pilot signals and eventually receives pseudo-pilot signal 722 as its power increases. In response to pseudo-pilot signal 122, test device 720 transfers device identifier 725 which is received by wireless transceiver 116. Processing system 115 records the power level beyond the edge of detection boundary 750. Note that the above procedure could be repeated at various positions to provide additional power level data points.

Processing system 115 processes the power levels to select the appropriate power level for the pseudo-pilot signal. In some examples, system 115 extrapolates from a power level from one communication service to another. For example, a data structure could be provided that correlates public WIFI power levels with corresponding Sprint service power levels, so a WIFI power level for detection boundary 750 could be translated into a power level for a Sprint service.

Figure 8:
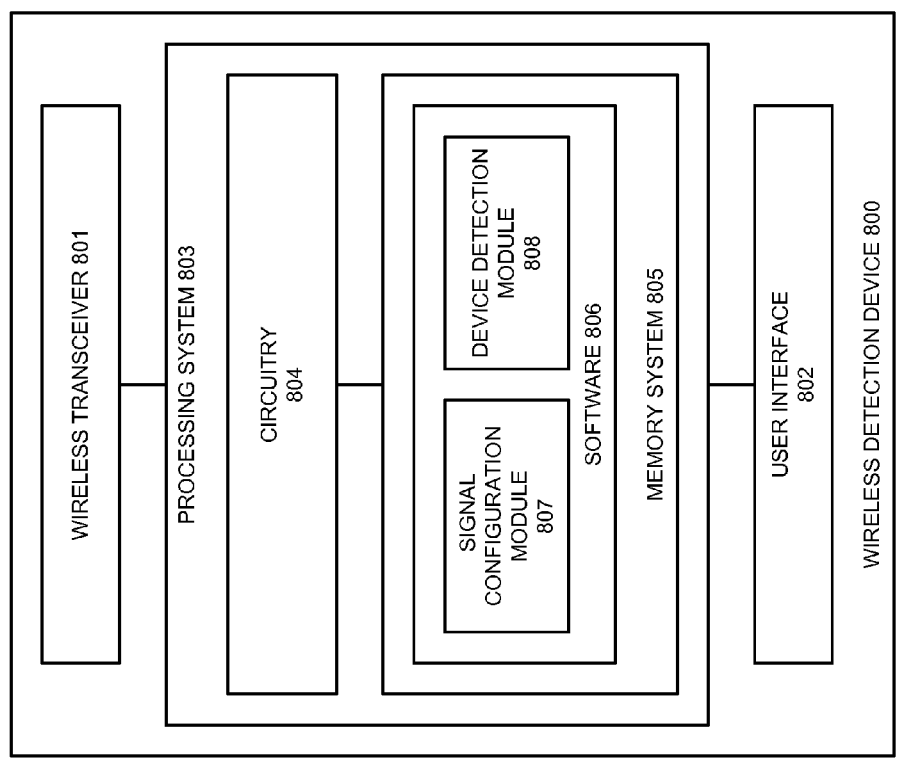
FIG. 8 illustrates a wireless detection device to detect wireless communication devices that respond to pilot signals.

FIG. 8 illustrates wireless detection device 800. Wireless detection device 800 provides an example of the wireless detection devices described above, although these wireless devices could use alternative configurations and operations. Wireless detection device 800 may comprise a telephone, computer, Internet appliance, wireless transceiver card, or some other wireless communication apparatus—including combinations thereof.

Wireless detection device 800 comprises wireless communication transceiver 801, user interface 802, and processing system 803. Processing system 803 is linked to wireless transceiver 801 and user interface 802. Processing system 803 includes processing circuitry 804 and memory system 805 that stores operating software 806. Operating software 806 comprises software modules 807-808. Wireless detection device 800 may include other well-known components such as a battery and enclosure that are not shown for clarity.

Wireless communication transceiver 801 comprises RF communication circuitry and an antenna. The RF communication circuitry typically includes an amplifier, filter, RF modulator/demodulator, and signal processing circuitry. Wireless communication transceiver 801 may also include a memory device, software, processing circuitry, or some other communication components. Wireless communication transceiver 801 may use various protocols, such as Code Division Multiple Access (CDMA), Global System for Mobile communications (GSM), Universal Mobile Telecommunications System (UMTS), High-Speed Packet Access (HSPA), Evolution-Data Optimized (EV-DO), Long Term Evolution (LTE), Worldwide Interoperability for Microwave Access (WiMAX), IEEE 802.11 protocols (Wi-Fi), Bluetooth, or some other wireless protocol that facilitates wireless communications. Note that wireless transceiver 801 may use multiple wireless protocols for pseudo-pilot signals that comprise various different signal components.

User interface 802 comprises components that interact with a user to receive user instructions and to present information. User interface 803 may include a speaker, microphone, buttons, lights, display screen, touch screen, touch pad, scroll wheel, communication port, or some other user input/output apparatus—including combinations thereof.

Processing circuitry 804 comprises microprocessor and other circuitry that retrieves and executes operating software 806 from memory system 805. Memory system 805 comprise a disk drive, flash drive, data storage circuitry, or some other memory apparatus. Processing circuitry 804 is typically mounted on a circuit board that may also hold memory device 805 and portions of transceiver 801 and interface 802. Operating software 806 comprises computer programs, firmware, or some other form of machine-readable processing instructions. Operating software 806 may include an operating system, utilities, drivers, network interfaces, applications, or some other type of software. In this example, operating software 806 comprises software modules 807-808, although software 806 could have alternative configurations in some examples.

When executed by processing circuitry 804, operating software 806 directs processing system 803 to operate wireless detection device 800 as described above. In particular, signal configuration module 807 directs processing system 803 to: identify a wireless communication service(s), select a pseudo-pilot signal configuration, perform a power level test, and transmit the corresponding pseudo-pilot signal. Device detection module 808 directs processing system 803 to: store device IDs and their time of receipt, display device IDs and their time of receipt, transfer device IDs and their time of receipt, and perform the alerting operation for user-selected device IDs.

Referring back to FIG. 1, wireless device 101 and wireless system 102 each comprise RF communication circuitry and an antenna. The RF communication circuitry typically includes an amplifier, filter, RF modulator, and signal processing circuitry. Wireless system 102 may also comprise a router, server, memory device, software, processing circuitry, cabling, power supply, network communication interface, structural support, or some other communication apparatus. Wireless system 102 could comprise a base station, Internet access node, telephony service node, wireless data access point, or some other wireless communication system—including combinations thereof. Some examples of wireless system 102 include a base transceiver station (BTS), base station controller (BSC), radio base station (RBS), Node B, enhanced Node B (eNode B), and others. Wireless network protocols that may be utilized by wireless device 101 and wireless system 102 include CDMA, GSM, UMTS, HSPA, EV-DO, LTE, WiMAX, Wi-Fi, Bluetooth, or some other communication format—including combinations thereof.

Control system 103 could be a server, computer, phone, network platform, or some other computer and communication system. Control system 103 could communicate over various networks including the internet, wide-area wireless networks, or the like. Control system 103 is equipped to receive text messages, emails, or some other type of data messages.

Wireless detection device 110 may also include a battery, enclosure, communication ports, or some other communication or computer components. Wireless detection device 110 could comprise a phone, transceiver, computer, game console, Internet appliance, network interface card, media player, or some other wireless communication apparatus—including combinations thereof.

User interface 114 includes a components that interact with a user to receive user instructions and to present media and/or information to the user. User interface 114 may include a speaker, microphone, buttons, lights, display screen, touch screen, touch pad, scroll wheel, communication port, or some other user input/output apparatus—including combinations thereof.

Processing system 115 comprises microprocessor and other circuitry that retrieves and executes operating software from a memory system. The memory system comprises a disk drive, flash drive, data storage circuitry, or some other memory apparatus. The software comprises computer programs, firmware, or some other form of machine-readable processing instructions.

Transceiver 116 comprises Radio Frequency (RF) communication circuitry and an antenna. The RF communication circuitry typically includes an amplifier, filter, modulator, demodulator, and signal processing circuitry. Wireless network protocols that may be utilized by transceiver 116 include CDMA, GSM, UMTS, HSPA, EV-DO, LTE, WiMAX, Wi-Fi, Bluetooth, or some other communication format—including combinations thereof.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless detection device to detect a wireless communication device, the method comprising:
   in a user interface, receiving a user input indicating at least one wireless communication network service;
   in a processing system, processing the user input to select a pseudo-pilot signal configuration, the pseudo-pilot configuration arranged for detection of at least the wireless communication device without registration of the wireless communication device for wireless service from the wireless detection device;
   in a wireless transceiver, wirelessly transmitting a pseudo-pilot signal having the selected pseudo-pilot signal configuration for receipt by the wireless communication device;
   in the wireless transceiver, wirelessly receiving a device identifier from the wireless communication device seeking to engage in a registration process to receive wireless service from the wireless detection device, wherein the wireless detection device is not configured to provide wireless service;
   in the processing system, responsive to receiving the device identifier, storing data indicating the device identifier and a time when the device identifier was received from the wireless communication device.

2. The method of claim 1 further comprising, in the wireless transceiver, transferring the data indicating the device identifier and the time of receipt to a wireless communication system for delivery to a control system.

3. The method of claim 1 further comprising, in the user interface, displaying the data indicating the device identifier and the time of receipt.

4. The method of claim 3 further comprising:
   in the user interface, receiving another user input selecting the device identifier for an alert;
   in the processing system, if the device identifier is received again from the wireless communication device responsive to the pseudo-pilot signal, then generating an alert including the data indicating the device identifier and a time of receipt;
   in the transceiver, wirelessly transferring the alert to a wireless communication system for delivery to a control system.

5. The method of claim 4 wherein the alert comprises a data message and wherein the control system comprises another wireless communication device.

6. The method of claim 1 wherein:
   the user input indicates multiple wireless communication network services;
   the selected pseudo-pilot signal configuration comprises a set of pseudo-pilot signal components that are individually associated with the multiple wireless communication network services.

7. The method of claim 1 further comprising:
in the user interface, presenting a user instruction to place a test device at a detection boundary;
in the wireless transceiver, wirelessly transmitting a test signal at increasing power levels;
in the wireless transceiver, wirelessly receiving a test response and recording one of the power levels being used when the test response is received;
in the processing system, processing the one power level to select an operational power level for transmission of the pseudo-pilot signal.

8. The method of claim 1 further comprising:
in the user interface, presenting a user instruction to place a test device beyond a detection boundary;
in the wireless transceiver, wirelessly transmitting a test signal at increasing power levels;
in the wireless transceiver, wirelessly receiving a test response and recording one of the power levels being used when the test response is received;
in the processing system, processing the one power level to select an operational power level for transmission of the pseudo-pilot signal.

9. The method of claim 1 wherein the wireless detection device comprises a wireless phone.

10. A wireless detection device to detect a wireless communication device comprising:
a user interface configured to receive a user input indicating at least one wireless communication network service;
a processing system configured to process the user input to select a pseudo-pilot signal configuration, the pseudo-pilot configuration arranged for detection of at least the wireless communication device without registration of the wireless communication device for wireless service from the wireless detection device;
a wireless transceiver configured to wirelessly transmit a pseudo-pilot signal having the selected pseudo-pilot signal configuration, to wirelessly receive a device identifier from the wireless communication device seeking to engage in a registration process to receive wireless service from the wireless detection device, wherein the wireless detection device is not configured to provide wireless service;
responsive to receiving the device identifier, the processing system configured to store data indicating the device identifier and a time when the device identifier was received from the wireless communication device.

11. The wireless detection device of claim 10 wherein the wireless transceiver is configured to transfer the data indicating the device identifier and the time of receipt to a wireless communication system for delivery to a control system.

12. The wireless detection device of claim 10 wherein the user interface is configured to display the data indicating the device identifier and the time of receipt.

13. The wireless detection device of claim 12 wherein:
the user interface is configured to receive another user input selecting the device identifier for an alert;
the processing system is configured, if the device identifier is received again from the wireless communication device responsive to the pseudo-pilot signal, to generate an alert including the data indicating the device identifier and a time of receipt;
the transceiver is configured to wirelessly transfer the alert to a wireless communication system for delivery to a control system.

14. The wireless detection device of claim 13 wherein the alert comprises a data message and wherein the control system comprises another wireless communication device.

15. The wireless detection device of claim 10 wherein the user input indicates multiple wireless communication network services and the selected pseudo-pilot signal configuration comprises a set of pseudo-pilot signal components that are individually associated with the multiple wireless communication network services.

16. The wireless detection device of claim 10 wherein:
the user interface is configured to present a user instruction to place a test device at a detection boundary;
the wireless transceiver is configured to wirelessly transmit a test signal at increasing power levels and to wirelessly receive a test response; and
the processing system is configured to record one of the power levels being used when the test response is received and to process the one power level to select an operational power level for transmission of the pseudo-pilot signal.

17. The wireless detection device of claim 10 further comprising:
the user interface is configured to present a user instruction to place a test device beyond a detection boundary;
the wireless transceiver is configured to wirelessly transmit a test signal at increasing power levels and to wirelessly receive a test response; and
the processing system is configured to record one of the power levels being used when the test response is received and to process the one power level to select an operational power level for transmission of the pseudo-pilot signal.

18. The wireless detection device of claim 10 wherein the wireless detection device comprises a wireless phone.

* * * * *